May 29, 1951 W. J. BROWN 2,554,695
CURRENT LIMIT CONTROL CIRCUIT
Filed Sept. 11, 1948 3 Sheets-Sheet 1

INVENTOR.
WALTER J. BROWN
BY
Woodling and Krost
attys

May 29, 1951  W. J. BROWN  2,554,695
CURRENT LIMIT CONTROL CIRCUIT
Filed Sept. 11, 1948  3 Sheets-Sheet 2

INVENTOR.
WALTER J. BROWN
BY
Woodling and Krost
attys

May 29, 1951

W. J. BROWN 2,554,695

CURRENT LIMIT CONTROL CIRCUIT

Filed Sept. 11, 1948

INVENTOR.
WALTER J. BROWN
BY
Woodling and Krost
attys

Patented May 29, 1951

2,554,695

UNITED STATES PATENT OFFICE 2,554,695

CURRENT LIMIT CONTROL CIRCUIT

Walter J. Brown, Cleveland Heights, Ohio

Application September 11, 1948, Serial No. 48,919
In Great Britain September 12, 1947

38 Claims. (Cl. 318—332)

The invention relates in general to control systems and more particularly to current limit control circuits for controlling power converters having an electrical output.

An object of the invention is to provide a current limiting circuit for controlling an electric power converter supplying current to a load which includes an impedance in series with the load developing a signal voltage thereacross dependent upon the load current and which is connected to the control system through a rectifier and a source of reference voltage, which opposes the signal voltage.

Another object of the invention is to provide a current limiting control circuit for a controllable electric power converter wherein a resistance is connected in series with the converter load to obtain a signal voltage and wherein a rectifier interconnects this resistance and a reference voltage to allow the signal voltage to take control of the converter output after the output current thereof has reached a predetermined value.

A further object of the invention is to provide a control circuit for an electric power converter in which a stepless current limiting effect is obtained by balancing the voltage drop across a series connected impedance against a reference voltage and applying the resultant voltage to the controlling terminals of the converter.

A still further object of the invention is to provide an electronically controlled power converter supplying a D. C. motor with a normal control circuit in which a fixed fraction of the motor voltage is balanced against a voltage controlling reference voltage and applied to the converter controlling terminals and is further provided with a current limiting reference voltage which is applied through the medium of a rectifier to the converter controlling terminals in the correct sense to dominate the normal control when the motor current reaches a predetermined value to thus prevent any further undesirable rise in the motor current.

Yet another object of the invention is to provide an electronically controlled power converter supplying a direct current motor armature with a normal control circuit in which a fraction of the converter output voltage is balanced against the sum of a compounding voltage derived from a compounding impedance in series with the armature and of a speed controlling reference voltage and is applied to the converter controlling terminals and also to provide a current limit control circuit in which a voltage derived from a current limiting impedance in series with the armature, and which is opposite in sense to the compounding voltage, is balanced against a current limiting reference voltage and is applied through the medium of a rectifier to the converter controlling terminals so as to limit the current delivered to the motor armature.

Other objects and a fuller understanding of my invention may be had by referring to the following description and claims, taken in conjunction with the accompanying drawings, in which:

Figure 1:
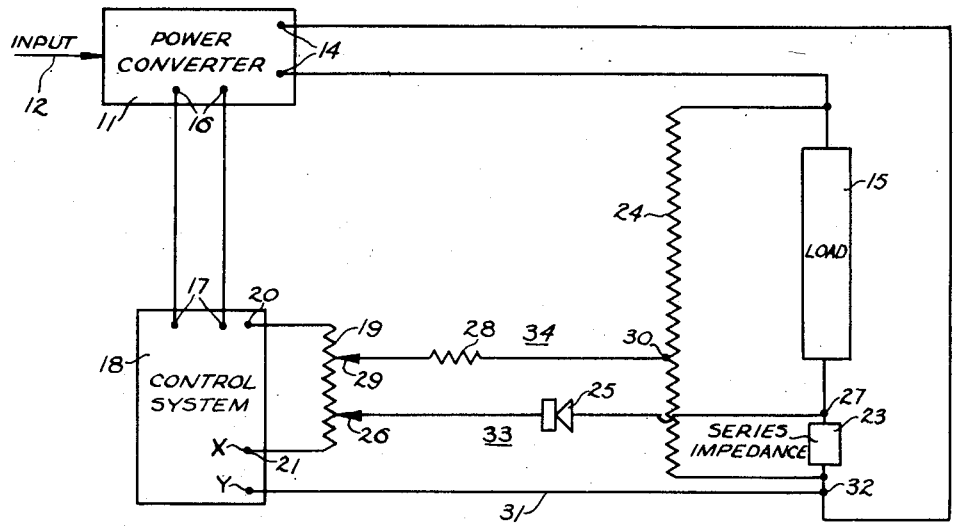
Figure 1 illustrates a basic control circuit according to my invention.

The circuit of Fig. 1 shows a power converter 11 connected to and deriving power from a power source 12. The power source 12 may be a source of electric power and the power converter 11 an electric power converter or alternatively, the source 12 may be a source of mechanical power and the power converter 11 an electrical generator. Output terminals 14 are provided on the power converter 11 and supply electrical energy to a load 15. The converter has control terminals 16 to which are connected the output terminals 17 of a control system 18. The control system includes an impedance 19 connected across a voltage source appearing at the terminals 20 and 21. The control system 18 also includes input terminals X and Y, and the input terminal X has been shown as the same as the terminal 21. An impedance 23 has been shown as connected in series with the load 15 across the output terminals 14 of the converter 11. The impedance 23 may be designated as a current limit impedance which develops a current limit signal voltage thereacross in proportion to the current supplied to the load 15 from the converter 11. The impedance 23 may usually take the form of a resistance, and is part of a current limit circuit 33. An impedance 24 is shown as being connected in parallel with the load 15 and the impedance 23 and forms part of a voltage control circuit 34. This impedance 24 has been shown as a resistance and may be designated as a voltage control impedance for deleveping a voltage thereacross proportional to the voltage applied to the load 15. A rectifier 25 is shown connected between an adjustable tap 26 on the impedance 19 and the juncture 27 between the load 15 and the series impedance 23. An impedance 28 is shown connected between an adjustable tap 29 on the impedance 19 and a tap 30 on the voltage control impedance 24. A conductor 31 interconnects the input terminal Y and the terminal 32 at the lower end of the series impedance 23.

The circuit of Fig. 1 operates in a manner to limit the current applied to the load 15 from the converter 11. The adjustable tap 26 is used to obtain a current limit reference voltage from the impedance 19 which is connected across the voltage appearing at the terminals 20 and 21. This current limit reference voltage establishes the value at which the current is limited in the load 15. The current limit circuit 33 obtains a signal voltage from the series impedance 23 and combines it with the voltage obtained from the current limit reference voltage obtained from the impedance 19 by the adjustable tap 26. These two voltages are combined by the rectifier 25 which interconnects these two impedances and the combination of these voltages is applied to the main input terminals X and Y. The rectifier 25 passes unidirectional current and, hence, may be designated as a unidirectional current passing device. When the voltage drop across the series impedance 23 exceeds the voltage of the current limit reference voltage, the rectifier 25 is adapted to pass current and it is this passage of current and the corresponding voltage drops occurring in this circuit that effect control of the control system by applying this combined voltage at the input terminals X and Y. When the load current is below the desired limiting value, the converter 11 may be controlled by any known method. The voltage control circuit 34 has been shown for the purpose of illustrating one method of controlling the conditions of the load 15 when the load current is below the limiting value; in this case, it would be controlled by the voltage applied to this load 15. It will be seen that this is a form of a feedback arrangement wherein the voltage across the lower portion of the impedance 24 is combined with the voltage obtained from the impedance 19 by the adjustable tap 29, and this combined voltage is then applied to the input terminals X and Y of the control system. The voltage control circuit has been shown as including an impedance 28 which interconnects the adjustable tap 29 and the terminal 30 on the voltage control impedance 24.

The purpose of impedance 28 is to allow the current limit control to dominate the voltage control when the limiting value of current is reached. To ensure such domination, the impedance of the voltage control circuit 34 is made relatively high compared with the impedance of the current limit circuit 33 while the rectifier 25 is conducting; in this way, after the limiting value of current is reached, the rectifier 25 will conduct and the voltage across terminals X and Y will thereafter depend primarily upon the current limit control and only to a minor extent upon the voltage control. The relatively high impedance in circuit 34 may be obtained by including a specific impedance such as that shown at 28 in circuit 34, or it may be inherent in the circuit 34, for instance by using a high impedance element 24.

When the current is below the limiting value, the rectifier 25 will not conduct, and its impedance should then be high compared with the impedance of the voltage control circuit. In this way, the voltage control circuit will dominate the current limit circuit when the current is below the limiting value; the voltage across terminals X and Y will then be primarily dependent upon the voltage control, and only to a negligible extent upon the current limit control.

Figure 2:
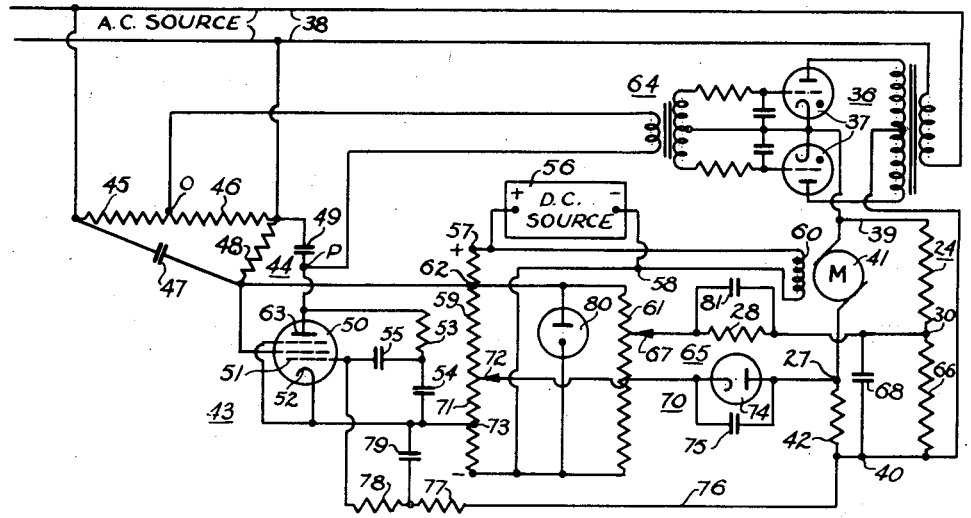
Figure 2 shows a modification of my invention which is applied to a motor control circuit having a speed control circuit in addition thereto.

The Figure 2 illustrates an improvement of my circuit wherein the converter 36 is shown as including a pair of rectifier tubes or space discharge devices 37. The converter 36 is supplied with alternating current energy from an alternating current source 38. The converter 36 supplies rectified alternating current energy across output terminals 39 and 40 to a direct current motor armature 41. The voltage control impedance 24 has again been shown as connected across the converter output terminals 39 and 40. The voltage control impedance 24 again has a terminal 30 for applying a voltage control signal voltage obtained from the lower part 66 of this impedance 24. A current limit or series resistance 42 has been shown as being connected in series with the motor armature 41 across the converter output terminals 39 and 40. The juncture of this series resistance 42 and the motor armature 41 has been designated as the juncture 27.

A control system 43 is shown as including a phase shift network 44 energized from the alternating current source 38 and supplying a phase shifted alternating current voltage to the rectifier tubes 37 through a grid transformer 64. The phase shift network 44 is shown as being similar to the phase shift circuit shown in my copending application Ser. No. 779,909, filed October 15, 1947, now Patent No. 2,524,762, issued October 10, 1950. This is a sensitive phase shifting circuit which requires only a few volts change on the input to obtain a 180 degree phase shift of the output voltage. The phase shift network 44 includes generally a first and second resistance 45 and 46 connected across the alternating current source 38. The juncture of this first and second resistance 45 and 46 is designated as an output terminal O of this phase shift network 44. Also serially connected across the alternating current source 38 is a condenser 47 and a third resistance 48. The third resistance 48 develops a base line voltage across which are serially connected two reactances of opposite sign, namely the condenser 49 and the variable inductance 50, which has been shown as a thermionic reactance tube. The variable inductance tube 50 has a quadrature feedback circuit to enable it to exhibit the properties of an inductance. The variable inductance tube 50 has been shown as a pentode in order that it may have a high plate impedance which will change only slightly with variable bias applied between the control grid 51 and the cathode 52. The resistance 53 and condenser 54 establish the quadrature feedback relationship between the plate 63 and control grid 51, and the condenser 55 is used to isolate the plate 63 and control grid 51. An output terminal P of the phase shift network 44 is connected at the juncture of the condenser 49 and variable inductance 50, and the voltage across the output terminals O and P is thus applied to the grid transformer 64. The control system 43 also includes a direct current source 56 having positive and negative terminals 57 and 58, respectively. A bleeder resistance 59 is shown as being connected across the positive and negative terminals 57 and 58. A motor field 60 is also shown as being connected across the direct current source 56 and this provides a safety feature in that upon failure of the direct current source 56 which supplies the motor field 60, the entire control system becomes inoperative and the output of the converter 36 is reduced to zero. A resistance 61 is connected across a portion of the bleeder resistance 59 and is connected between the negative terminal 58 and a tap 62. A voltage control circuit 65 includes the lower portion 66 of the impedance 24 and a voltage control reference voltage obtained from the resistance 61 by the adjustable tap 67. The voltage control circuit 65 also includes the high resistance 28 which interconnects the adjustable tap 67 and the terminal 30 on the voltage control impedance 24. A filter condenser 81 is connected across the impedance 28. The voltage control circuit 65 further includes a neutralizing condenser 68.

A current limit control circuit 70 is provided which includes the current limit or series resistance 42 and a portion 71 of the bleeder resistance 59 which lies between an adjustable tap 72 and the terminal 73. The terminal 73 is connected to the cathode 52 of the variable inductance tube 50. The current limit control circuit also includes a rectifier 74 interconnecting the juncture 27 and the adjustable tap 72. A rectifier load condenser 75 is shunted across the rectifier 74. A conductor 76 interconnects the negative converter terminal 40 and the control grid 51 of the variable inductance tube 50. Inserted in this conductor 76 are first and second filter resistors 77 and 78, and a filter condenser 79 shunts this conductor to the cathode 52. A voltage regulator tube 80 is connected across the impedance 61 in order to hold the voltage thereacross substantially constant.

The operation of the circuit of Fig. 2 is basically the same as the operation of the circuit of Fig. 1. The converter 36 delivers a rectified alternating current across the terminals 39 and 40 which is applied to the motor armature 41. The motor field 60 is supplied from a separate source 56. The impedance 24 has a voltage thereacross proportional to the voltage applied to the motor armature 41 and the lower portion 66 thereof provides a voltage feedback for controlling the converter output by means of the phase shift network 44. The adjustable tap 67 obtains a voltage control reference voltage from the impedance 61 which, in the voltage control circuit 65 opposes the signal voltage from the impedance 66 to thus provide a control voltage which may be termed a first differential control voltage. This first differential control voltage is obtained at the terminals 73 and 40 and is thus applied as a bias between the control grid 51 and cathode 52 of the variable inductance tube 50. It will be seen that the adjustable tap 67 may obtain a variable voltage from the impedance 61, thus varying the bias applied to the thermionic reactance tube 50. As the bias on the variable inductance tube 50 is varied, the impedance of this tube will vary and thus the relative impedance of the condenser 49 and variable inductance 50 will also vary. This varying relative impedance will shift the phase of the output voltage between the terminals O and P, and therefore of the voltage supplied by the grid transformer 64 to the rectifier tubes 37 to thus control the output of the converter 36. It will, therefore, be seen that the adjustable tap 67 is a speed control for the motor armature 41.

It will be seen that the top of the series resistance 42 is positive and it will also be seen that the tap 72 on the bleeder resistance 59 is positive relative to the terminal 73. The voltages across these two resistances are thus in opposition when connected by the rectifier 74 and form a second differential control voltage. If the output from the converter 36 tends to exceed a predetermined given value, the voltage drop across the series resistance 42 will exceed the arithmetic sum of the current limit reference voltage obtained from the impedance 71 and the effective negative direct current bias on the variable inductance tube 50, and the rectifier 74 will then commence to conduct current, since the positive voltage on the anode thereof will exceed the positive voltage applied to the cathode thereof. The resistance 28 may also be considered as a load resistance for the rectifier 74, for when this rectifier 74 begins to conduct, a voltage drop will appear across this resistance 28. This will tend to make the effective bias on the tube 50 increase in a negative direction on the grid 51 thus increasing the impedance of this tube 50 which through the phase shift network 44 will reduce the converter output. It will be seen that the value of current at which the rectifier 74 will begin to conduct may be regulated by the adjustable tap 72 which obtains the current limit reference voltage from the impedance 71.

Since the phase shift network 44 is operable from a change of direct current bias of the order of one volt or less, it will be seen that the alternating current ripple should be eliminated as completely as possible from the effective bias supplied to this tube 50. To this end, the filter resistors and condenser 77, 78 and 79 are inserted in the conductor 76 in order to minimize the ripple from the feedback impedance 66. The neutralizing condenser 68 serves the useful purpose of minimizing or neutralizing the ripple appearing between the terminals 27 and 30, and thus stabilizing the operation of the current limit control. Since the motor armature 41 is fed from a rectified alternating current source, there will be considerable alternating current ripple across the output terminals 39 and 40 and also a considerable alternating current ripple across series resistance 42. By judicious selection of the value of the neutralizing condenser 68 in relation to the value of resistor 24 and its tapping point 30, the alternating current ripple across the terminals 27 and 30 may be brought to a minimum. This may be accomplished by making the alternating current ripple across resistance 66 equal and opposite to the ripple across impedance 42. I have furthermore found that condenser 68 makes the waveform of the ripple across resistance 66 similar to that across resistance 42, and thus I am able to secure good minimization of the resultant of the two opposing ripples which appear across terminals 30 and 27. The filter condenser 81 is connected in shunt across the impedance 28. This filter condenser 81 filters out any ripple which might otherwise exist between the direct current control source 56 and the rectified alternating current output of the converter 36. In the practical case, the direct current source 56 will be a form of rectifier or converter obtaining energy from an alternating current source and supplying a rectified direct current to the motor field 60, and this source will frequently have several hundred volts of alternating current ripple. A ripple of several hundred volts will also usually exist in the rectified alternating current supply to the armature from converter 36 and there is frequently sufficient stray capacity to ground from both the armature and field circuits to create a high alternating current ripple across the impedance 28 since this is usually of a high value of impedance. The filter condenser 81 serves the useful purpose of eliminating this ripple, since the value of this filter condenser 81 will be many times the value of the stray capacity to ground of the motor field and armature. The rectifier load condenser 75 serves a somewhat similar purpose as the filter condenser 81 and it tends to stabilize the operation of the current limit control circuit 70 by minimizing the ripple across the rectifier 74.

In a manner similar to the operation of Fig. 1, the voltage control circuit 65, including the impedance 28, should have an impedance which is high in relation to the impedance of the current limit circuit 65 when the rectifier 74 is conducting, so that the current limit control dominates the voltage control when the load current in impedance 42 exceeds a predetermined value. Conversely, when the load current is below the predetermined value and rectifier 74 is non-conducting, the impedance of rectifier 74 and accordingly of current limit circuit 70 should be high compared with the impedance of voltage control circuit 65 so that the voltage control then dominates the current limit control. The safety feature of having the control circuit supplied from the same direct current source 56 as is the motor field 60 prevents dangerous overspeed conditions of the motor armature 41 should the direct current source 56 fail for any reason. Upon failure of this direct current source 56, the impedance of the variable inductance tube 50 will increase to a maximum value, which will shift the phase of the output voltage of the phase shift network 44 in a direction to provide a minimum or zero output of the converter 36.

For the purpose of illustration, let us assume that the converter output is not to exceed 15 amperes. If the series resistance 42 has a resistance value of 1 ohm, then 15 volts will be developed thereacross as a signal voltage at the current limiting value of 15 amperes. In order to make the rectifier 74 conduct current at this 15 volt signal value, the adjustable tap 72 should be set at a value to obtain the requisite reference voltage of current limit. Let us assume that the variable inductance tube 50 achieves a full output of the converter 36 with a bias of minus 4 volts on the control grid 51, and further that a bias of minus 5 volts on this control grid 51 will decrease the converter output to zero. The effective bias required for the 15 ampere output of the converter 36 will, therefore, be approximately minus 4 volts to the grid 51. With a 15 volt signal voltage obtained from the series resistance 42, the correct value of the current limit reference voltage obtained from impedance 71 would, therefore, be plus 11 volts at the adjustable tap 72 relative to the cathode terminal 73. If the current output of the converter 36 attempts to increase beyond the 15 ampere limit, the increased voltage drop across the series resistance 42 will make the rectifier 74 conduct, and thereafter terminal 27 will maintain the same direct current voltage as tap 72, namely plus 11 volts with respect to the cathode 52. Should the current increase to 16 amperes, this will produce a drop of 16 volts in resistor 42 and will result in a voltage at terminal 40 of plus 11 minus 16 volts, equal to minus 5 volts which is applied to the grid and which will cut off the converter. Accordingly the current can never reach 16 amperes.

Figure 3:
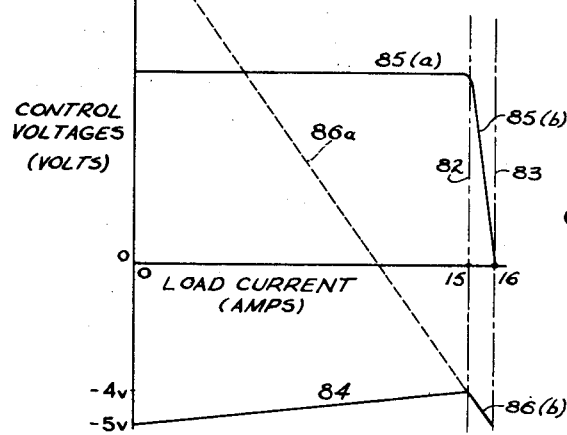
Figure 3 is a curve showing effects of the current limiting circuit upon the control and load voltages.

The Fig. 3 may be referred to as an aid in understanding the operation of the circuit of Fig. 2. The load current, in Fig. 3, which flows through resistance 42 is plotted along the X axis, and the control voltages are plotted along the Y axis. Dash-dot lines 82 and 83 show the incidence and completion of the current limiting effect at 15 and 16 amperes, respectively. At currents below 15 amperes the output is controlled by the voltage control circuit and the output voltage adjusts itself until the control tube bias lies between minus 4 and minus 5 volts. As the load is increased the output voltage decreases slightly, thus decreasing the negative bias as shown in curve 84 and preventing any substantial reductions in output voltage as shown in curve 85a. Meanwhile, the current limit signal voltage increases in a negative direction in proportion to the current in resistance 42, and the differential between this and the current limit reference voltage of plus 11 volts is shown by the dotted line 86a. When the curve 86a representing the differential current limit control voltage intersects curve 84, the rectifier 74 will conduct and thereafter the output will be controlled by the differential current limit control voltage as shown by curve 86b. Accordingly the converter output voltage will fall rapidly as the load current is further increased, and the output voltage will fall to zero before the load current reaches 16 amperes, as shown by curve 85b.

Figure 4:
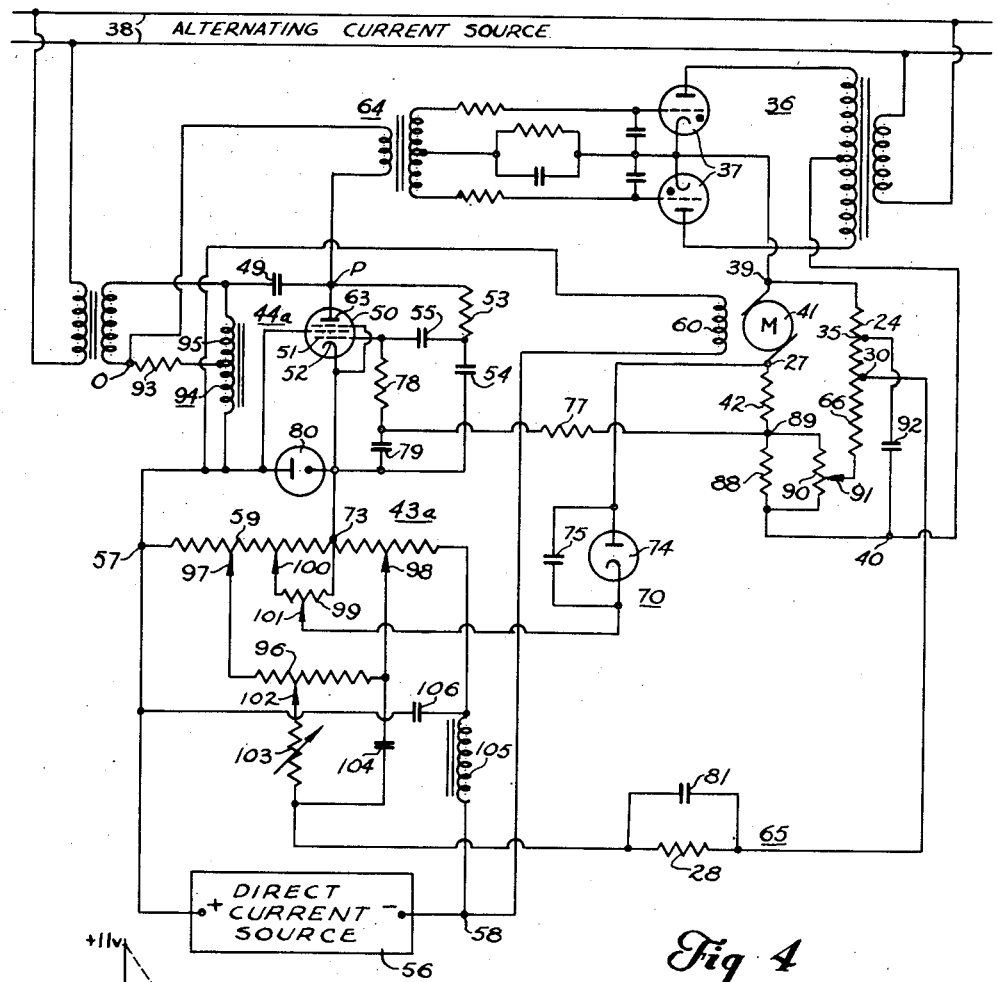
Figure 4 shows a still further modification of the invention shown in Figure 2 and incorporates a compounding control.

The circuit of Fig. 4 illustrates the further improvement of the invention wherein the converter 36 again supplies rectified alternating current energy to a motor armature 41. In this modification, the motor armature circuit includes a compounding resistance 88 connected in series with the motor armature 41 and series impedance 42. The juncture of the motor armature 41 and the series resistance 42 is again designated by the reference character 27. The juncture of the series resistance 42 and the compounding resistance 88 is designated as a terminal 89. A potentiometer 90 is connected in shunt with the compounding resistance 88 across the terminals 89 and 40. The lower end 66 of the voltage control impedance 24 is connected to the adjustable tap 91 on this potentiometer 90. A neutralizing condenser 92 is connected between a tap 35 on the voltage control impedance 24 and the terminal 40 of the converter 36.

A control system 43a is essentially the same as the control system 43 of the circuit of Fig. 2. This control system 43a includes the direct current source 56 as well as a phase shift network 44a. This phase shift network 44a is also a sensitive phase shift system as was the phase shift network 44 of the circuit of Fig. 2. This phase shift network 44a is similar to the phase shift network shown in my copending application Ser. No. 770,966, filed August 28, 1947, now Patent No. 2,524,759, issued October 10, 1950. The phase shift network 44a is supplied with alternating current energy from an alternating current source which should preferably be the same source that supplies the converter 36. A resistance 93 and a portion 95 of an inductance 94 are serially connected across an alternating current voltage derived from the alternating current source 38. An output terminal O of the phase shift network 44a is connected at the left-hand end of the resistance 93. Across the inductance 94 are serially connected the condenser 49 and variable inductance tube 50 with the output terminal P connected therebetween. By varying the bias between the grid 51 and the cathode 52 of this variable inductance tube 50 the impedance thereof may vary, which will shift the phase of the output voltage of the phase shift network 44a applied through the grid transformer 64 to the converter 36.

The bleeder resistance 59 is again connected across the direct current source 56, however, the various reference voltages are obtained therefrom in a slightly improved manner from that shown in the Figs. 1 and 2. A speed control potentiometer 96 is connected to the bleeder resistance by two adjustable taps 97 and 98. The adjustable tap 97 adjusts the maximum speed of the motor armature 41, and the adjustable tap 98 determines the minimum speed of this motor armature 41. The cathode 52 is again connected to a terminal 73 on the bleeder resistance 59. A current limit potentiometer 99 is connected to the bleeder resistance 59 at this terminal 73 and at an adjustable tap 100. The rectifier 74 and shunting rectifier load condenser 75 are again connected between the terminal 27 and the current limit potentiometer 99 at an adjustable tap 101 thereof. The impedance 28 and shunting filter condenser 81 are again connected between the terminal 30 on the voltage control impedance 24 and the speed control potentiometer 96 at an adjustable tap 102 thereof. In this last-mentioned connection an acceleration control is provided which includes an acceleration rheostat 103 and acceleration condenser 104. This RC combination provides a variable time delay circuit in applying the direct current voltage controlling reference bias to the variable inductance tube 50. A filter choke 105 is connected in the negative lead from the direct current source 56 to the bleeder resistance 59, and a filter condenser 106 is connected across the bleeder resistance 59.

The operation of the circuit of Fig. 4 is similar to the operation of the circuit of Figs. 1 and 2. A given positive direct current bias is obtained from the speed control potentiometer 96 as a voltage control reference voltage which is then opposed by a negative voltage obtained from the impedance 66 which in turn is opposed by a positive voltage obtained from the compounding potentiometer 90. This differential control voltage is thereupon supplied to the grid 51. The compounding potentiometer 90 is an impedance effectively in series with the armature 41 and, hence, as the load on the motor armature 41 increases, the counter E. M. F. thereof will decrease to permit the motor armature 41 to draw more current from the converter 36. This increase of current will produce an increasing voltage drop across the compounding potentiometer 90 which will vary the bias on the variable inductance tube 50 in a positive direction to thus increase the output of the converter 36, and thus to maintain the speed of the motor. Thus a compounding effect may be achieved to compensate for variations in the load of the motor armature 41. This circuit operation is more fully described in the copending application Ser. No. 33,539 of Kenneth L. Shrider, filed June 17, 1948, now abandoned.

The current limit potentiometer 99 again provides a current limit reference voltage which is positive toward the grid of the variable inductance tube 50. This current limit reference voltage again determines the value at which the output current of the converter 36 is limited. The signal voltage obtained from the current limit impedance 42 is positive as applied to the anode of the rectifier 74, and this signal voltage is opposed by the arithmetical sum of the effective negative bias on the grid of the tube 50, as established by the voltage control circuit, and the voltage obtained from the current limit reference voltage. When the current limit signal voltage exceeds the combination of the bias on the tube 50 and the current limit reference voltage, then the rectifier 74 will conduct and, hence, will have a low impedance thereacross. As the rectifier 74 conducts current, a corresponding voltage drop will appear across the impedance 28, to thus change the effective bias on the tube 50 in a negative direction to thereby reduce the output of the converter 36.

The neutralizing condenser 92 serves a function similar to the neutralizing condenser 68 in the circuit of Fig. 2. In the circuit of Figure 4, the condenser has been tapped off the upper portion of impedance 24 at tapping 35, as I have found that a smaller condenser can then be used, and furthermore an accurate minimum balance of the ripple voltage can be obtained by adjusting the position of tap 35. Condenser 92 and tap 35 may be adjusted to establish a value of alternating current ripple voltage which is equal and opposite to the alternating current ripple voltage across the compounding resistance 88 to thus achieve a minimum amount of alternating current ripple across the terminals 89 and 30. Alternatively, they may be adjusted to establish a value of alternating current ripple voltage which is equal and opposite to the alternating current ripple voltage across both the resistances 88 and 42 thus to achieve a minimum alternating current ripple voltage across the terminals 27 and 30.

Figure 5:
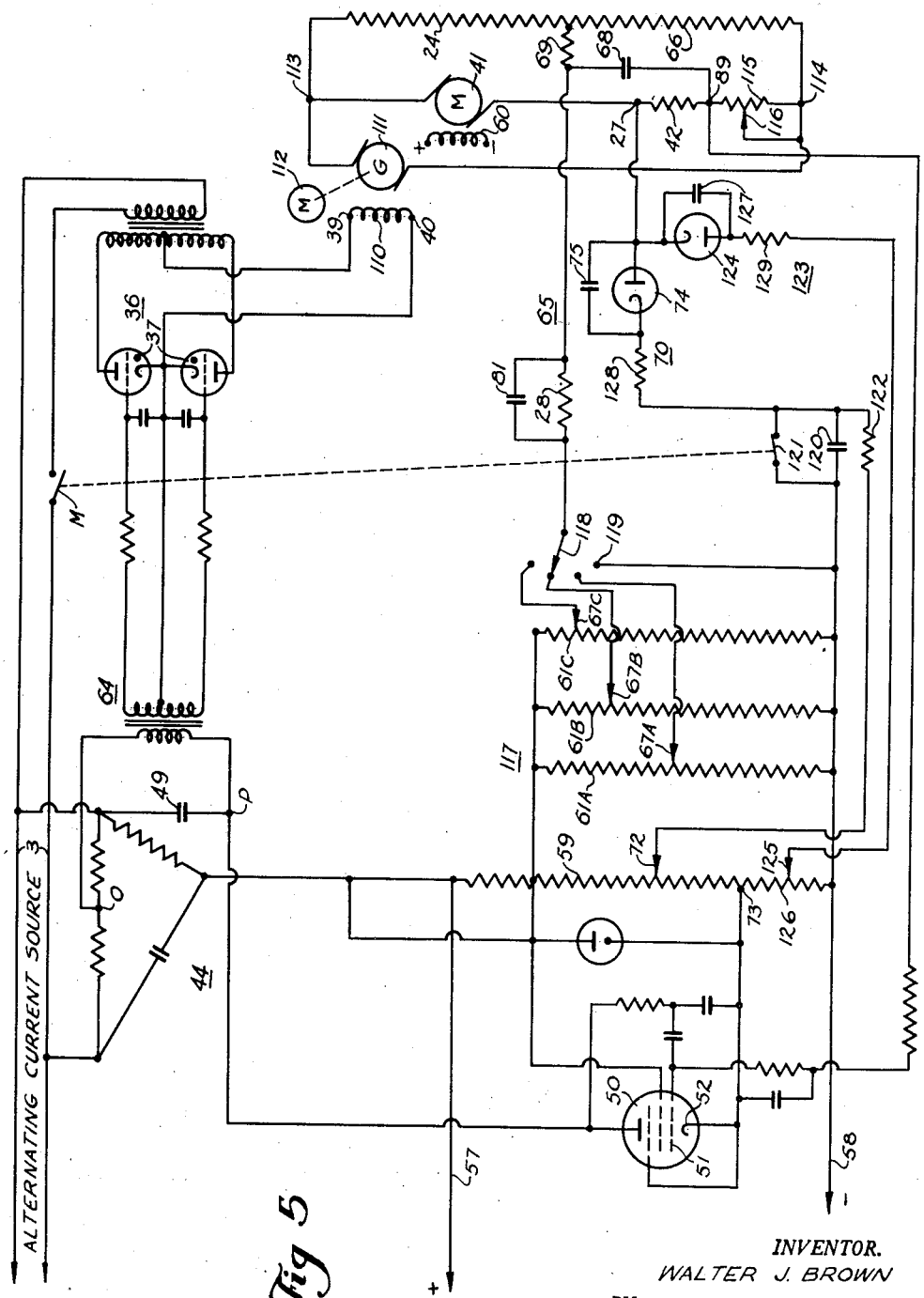
Figure 5 illustrates the preferred embodiment of the invention which is an improvement over the circuit of Figure 4 and which shows a controllable converter supplying energy to the field of a motor generator set.

The circuit of Fig. 5 shows the preferred embodiment of the invention wherein the converter 36 is supplying an output across terminals 39 and 40 to a generator field 110. The generator armature 111 is driven from a motor or prime mover 112. The output of the generator armature 111 is provided across positive and negative terminals 113 and 114, respectively. This generator armature output is supplied to the motor armature 41, with the motor having a motor field 60 supplied from any suitable source. A voltage control impedance 24 is shown as being connected across the terminals 113 and 114 of the generator armature 111. A compounding impedance 115 is connected between the lower end 89 of the series impedance 42 and the negative terminal 114. An adjustable tap 116 on the impedance 115 is connected to the negative terminal 114 and adjusts the amount of compounding desired. A filter condenser 68 and a filter resistance 69 are again provided in a fashion somewhat similar to that in the circuit of Fig. 2. A main contactor M controls the supply of alternating current energy to the converter 36. A control system 117 includes a phase shift network 44 similar to that shown in the circuit of Fig. 2. The control system 117 includes the current limit control circuit 70, which operates in essentially the same manner as in the circuit of Figs. 2 and 4; and also includes a plurality of voltage control resistances 61a, 61b and 61c. These resistances each have an adjustable tap numbered, respectively, 67a, 67b and 67c. A selector switch 118 is used to select the operation of one of this plurality of voltage control impedances. The selector switch 118 also has an off position 119 which is connected to the negative end 58 of the bleeder resistance 59. A condenser 120 and a shunting switch 121 are connected between the cathode of the rectifier 74 and the negative terminal 58 of the direct current source 56. The switch 121 is interconnected with the main contactor M so that the switch 121 is open when the main contactor M is closed. A resistance 122 is connected in the lead from the cathode of rectifier 74 to the adjustable tap 72 of the current limit reference voltage setting.

A second current limiting circuit 123 is provided in the control system 117 and includes a second rectifier 124 with the cathode thereof connected to the terminal 27. The anode of this second rectifier 124 is connected to an adjustable tap 125 on the negative portion 126 of the bleeder resistance 59. A rectifier load condenser 127 is connected across the second rectifier 124. Stabilizing resistors 128 and 129 are preferably connected in the first and second current limit circuits, respectively, in series with the rectifiers 74 and 124.

The operation of this preferred embodiment is similar to the operation of the previously decribed circuit. The provision of the generator energized motor armature 41 with the converter 36 supplying the generator field 110 is a further illustration of a use for the control system of my invention. By the use of the generator and motor combination the amplification factor achieved by the control system in controlling the load current is still further increased. The converter 36 which converts alternating current energy into direct current energy may be considered as comprising merely the full wave rectifier system as described in the previous circuits or it may be considered as having its output terminals at the terminals 113 and 114 of the generator armature 111 with this converter output therefore being applied to the motor armature 41.

The condenser 120 and switch 121 provide insurance that the current limit circuit will operate at the instant of energization of the converter 36. When the main contactor M is open, the switch 121 is closed to connect the cathode of rectifier 74 to the extreme negative end of the bleeder resistance 59. This will bias the rectifier 74 such that it will conduct current and, hence, bias the grid 51 of the variable inductance tube 50 fully negative. When the main contactor M closes, the switch 121 opens and the condenser 120 charges slowly through the resistance 122 and gradually removes the negative bias from the grid 51 so that the current limiting circuit 70 will have time to operate on gradually increasing half cycles of current. The selector switch 118 provides a plurality of predetermined speed conditions which may be selected at will, and the current limiting circuit 70 allows a fast acceleration within a predetermined safe current limit between any of these various speed control settings as determined by the adjustable taps 67a, 67b and 67c. The off position 119 is provided to bias the grid 51 fully negative to cut off the converter output and hence the generator output across the terminals 113 and 114.

The use of a generator and motor combination presents the possibility of regeneration, especially when the motor 41 is driven by an overhauling load or when the load driven by the motor 41 has a high mechanical inertia and an attempt is made to reduce the speed thereof suddenly. Under these conditions the motor armature current will reverse in direction whenever the motor armature voltage exceeds the generator armature voltage. The second current limit control circuit 123 provides current limiting during regeneration. When the arithmetic sum of the regenerative voltage across the series impedance 42 and of the negative bias on the control tube 50 exceeds the current limit reference voltage obtained from the impedance 126, the second rectifier 124 will conduct and thus vary the bias on the variable inductance tube 50 in a direction to increase the output of the converter 36 and, hence, the output of the generator armature 111.

The neutralizing condenser 68 and neutralizing resistance 69 are connected in a manner similar to the connection in the circuit of Fig. 2. The neutralizing resistance 69 is connected in the lead to the impedance 28 and the neutralizing condenser 68 is connected at the left end of this neutralizing resistance 69 and the lower terminal 89 of the series resistance 42.

The value at which the current limiting effect takes place may be adjusted either by varying the current limit reference voltage obtained at the adjustable tap 72 or by varying the value of the current limit resistance 42. In the second current limit control circuit 123 it will be noted that the current limit reference voltage obtained at the adjustable tap 126 is a voltage which opposes the voltage from the series resistance 42 when there is a regenerative current from the motor armature 41. Further it will be seen that in this second current limit control circuit 123 the value at which the current limit will take place may be adjusted either by the setting of the adjustable tap 125 or by the value of the series resistance 42.

The operation of the circuit of Fig. 5 shows that the first current limit control circuit 70 decreases the output of converter 36 and, hence, decreases the load current in the motor armature 41. However, the second current limit control circuit 123 increases the output of converter 36 in order to decrease the regenerative load current in the motor armature 41. Alternative uses for the current limit circuit will be apparent to those skilled in the art. For example, if the converter 36 were to supply the field winding of an electric motor, then in order to limit the motor armature current, the converter output to the motor field must increase. Further, if this motor were energized from a generator or any other case where regenerative armature current is a possibility, then a second current limit control circuit to limit such regenerative motor armature current would need be arranged to decrease the converter output to the motor field.

Although I have described my invention with a certain degree of particularity in its preferred form, it is understood that the present disclosure of the preferred form has been made only by way of example and that numerous changes in the details of circuit construction and the combination and arrangement of circuit elements may be resorted to without departing from the spirit and the scope of the invention as hereinafter claimed.

What is claimed is:

1. In a system having a controllable power converter supplying power to a load which has a signal voltage representative of load current, the provision of a control system for the converter, comprising, means for establishing a reference voltage in opposition to said signal voltage, and rectifier means electrically in circuit with said converter for combining said signal and reference voltages to vary the converter output when there is a predetermined difference between said signal and reference voltages.

2. In an electrical system having a controllable converter supplying electrical power to a load which has an impedance effectively connected in series therewith, the provision of a current limiting control circuit for said converter including a reference voltage source, and a rectifier electrically in circuit with said converter for interconnecting said impedance and said reference voltage source to allow the voltage drop in said impedance to control the converter after the output current of the converter has reached a predetermined value.

3. In an electrical system having a controllable power converter supplying electrical power to a load which has an impedance in series therewith, the provision of a current limiting control circuit for said converter including a first reference voltage source, and a rectifier electrically in circuit with said converter for interconnecting said impedance and said reference voltage source to allow the voltage drop in the series impedance to take control of the converter output after the output current of the converter has reached a predetermined value.

4. The combination of claim 3 wherein the converter derives power from an alternating current source and delivers power to a direct current motor.

5. The combination of claim 4 wherein the converter is electronically controlled.

6. The combination of claim 5 wherein a second control voltage is obtained from the converter output voltage and from a second reference voltage source to control the converter output when the output current is less than a predetermined value, and means for applying the voltage of said series impedance through said rectifier to oppose the first reference voltage and thereby control the converter output when the output current exceeds said predetermined value.

7. In an electrical system having a controllable power converter supplying electrical power to a direct current load with an impedance effectively connected in series therewith to obtain a signal voltage, the provision of a current limit control circuit electrically in circuit with said converter to control the converter output, including, a reference voltage source, and a rectifier interconnecting said reference and signal voltages to obtain a direct current biasing control voltage to control said converter.

8. The combination of claim 7 wherein the converter includes a space discharge device having a control element and the direct current biasing control voltage is applied to said control element to effect stepless control of said converter.

9. In an electrical system having a controllable power converter supplying electrical power to the field of a generator the armature of which is connected to a load, and wherein an impedance is effectively in series with the generator armature, the provision of a current limit control circuit electrically in circuit with the converter, including a reference voltage source, and a rectifier interconnecting said impedance and said reference voltage source to allow the voltage drop in the series impedance to control said converter after the armature current of said generator has reached a predetermined value.

10. In an electrical system having a controllable converter supplying variable electrical energy to a load with an impedance effectively connected in series with the load to obtain a signal voltage corresponding to load conditions, the provision of a current limit control circuit electrically in circuit with the converter, including a reference voltage source connected in opposition to said signal voltage to produce a differential control voltage to control said controllable converter, and unidirectional impedance means in said current limit control circuit having a relatively high impedance when said signal voltage is less than a predetermined value established by said reference voltage and having a relatively low impedance when said signal voltage is greater than said predetermined value.

11. In an electrical system having a controllable electric power converter with output terminals and control terminals and with an impedance serially connected to the output terminals, the provision of a control circuit electrically in circuit with the control terminals of the converter including a reference voltage source, stepless control means, rectifier means for interconnecting said impedance and said reference voltage source to balance the voltage drop across said impedance against said reference voltage to obtain a resultant voltage, and means to apply said resultant voltage to said converter control terminals through said stepless control means to obtain a continuously variable output of said converter.

12. The combination of claim 11 wherein the converter supplies energy to a load and the impedance is a resistance effectively connected in series with the load.

13. The combination of claim 12 wherein the converter is controlled by electronic control means.

14. The combination of claim 13 wherein the converter derives power from an alternating supply and delivers power to a direct current load.

15. The combination of claim 14 wherein the load comprises a winding of a direct current motor.

16. In an electrical system having a controllable electric power converter supplying power to a load and having an impedance effectively connected in series with the load to obtain a signal voltage thereacross, the provision of a control system including first and second control circuits, said first control circuit providing control of said converter throughout a first range of operation, said second control circuit including said impedance, a reference voltage source, a rectifier interconnecting said impedance and said reference voltage source to allow said signal voltage to dominate the control established by said first control circuit when the output current to said load reaches a predetermined value to thus prevent undesirable further rise in output current.

17. The combination of claim 16 wherein the first control circuit has a given impedance and wherein the second control circuit has a low impedance relative to said first control circuit when said rectifier is conducting and having a high impedance relative to said first control circuit when said rectifier is not conducting.

18. In an electrical system having a controllable electric power converter supplying power to a direct current motor and having a resistance effectively connected in series with the motor to obtain a current limit signal voltage thereacross, the provision of a control system electrically in circuit with the converter, including a voltage controlling circuit and a current limit controlling circuit, said voltage controlling circuit including a voltage controlling reference voltage source, means for obtaining a fixed fraction of the motor voltage as a voltage controlling signal, and means for balancing said voltage controlling signal against said voltage controlling reference voltage to produce a first differential control voltage to control said converter, said current limit controlling circuit including a current limit reference voltage source, a rectifier for interconnecting said current limit reference and signal voltages in opposition to produce a second differential control voltage, and means for applying to said converter said second differential control voltage in the correct sense to dominate the control of said converter established by said voltage controlling circuit when the motor current reaches a predetermined value and to prevent any further undesirable rise in the motor current.

19. A control system for a controllable electric power converter supplying power to a direct current motor armature, said control system comprising a speed-controlling circuit and a current limit controlling circuit, said speed-controlling circuit including a speed controlling reference voltage source, means for obtaining a fraction of the converter output voltage as a speed control signal, means for obtaining a compounding voltage from a first impedance in series with the armature, and means for balancing said speed controlling signal against the sum of said compounding voltage and said speed controlling reference voltage to produce a first control voltage to control said converter, said current limit controlling circuit including a current limit reference voltage source, a second impedance effectively connected in series with said motor armature to obtain a current limit signal voltage thereacross, a rectifier for interconnecting said current limit reference and signal voltages in opposition to produce a second control voltage, said current limit signal voltage being in opposition to said compounding voltage, and means for applying said second control voltage to control said converter to limit the current delivered to said motor armature.

20. The combination of claim 19 wherein the current limit signal voltage is derived from a resistance connected in series with the load.

21. The combination of claim 20 wherein the compounding voltage is adjusted to give substantially constant motor speed as the load of the motor is increased up to a predetermined value of armature current, after which the current limit controlling circuit sharply reduces the motor speed and substantially prevents further rise of current when the load is further increased.

22. The combination of claim 21 wherein the speed controlling circuit has a given impedance and wherein the current limit controlling circuit has a low impedance relative to said speed controlling circuit when said rectifier is conducting and having a high impedance relative to said speed controlling circuit when said rectifier is not conducting thus permitting the current limit controlling circuit to dominate the speed controlling circuit when and only when a predetermined converter output current is reached.

23. The combination of claim 22 wherein the first and second control voltages are used to control the impedance of a thermionic reactance tube in a phase shifting network for controlling said converter.

24. In an electrical system having a controllable power converter supplying electric power to a load and having an impedance effectively connected in series with the load to obtain a current limit signal voltage thereacross, the provision of a control system electrically in circuit with said converter, including first and second current limit control circuits, said first current limit control circuit comprising a first current limit reference voltage source, a first rectifier for interconnecting said first current limit reference and signal voltages in opposition to produce a first differential control voltage, and means to apply to said converter said first differential control voltage to effect control of said converter when said converter output exceeds a predetermined value, said second current limit control circuit comprising a second current limit reference voltage source opposing said first current limit reference voltage source, a second rectifier connected in opposition to said first rectifier to interconnect said second current limit reference voltage and said current limit signal voltage to produce a second differential control voltage to thus control said converter when the current in said load exceeds a given value in the reverse direction.

25. A control system for a controllable electric power converter supplying power to the generator field of a motor-generator set, said control system comprising a speed-controlling circuit and a current limit controlling circuit, said speed-controlling circuit including a speed controlling reference voltage source, means for obtaining a fraction of the generator output voltage as a speed control signal, means for obtaining a compounding voltage from a first impedance in series with the motor, and means for balancing said speed controlling signal against the sum of said compounding voltage and said speed controlling reference voltage to produce a first control voltage to control said converter, said current limit controlling circuit including a current limit reference voltage source, a second impedance effectively connected in series with said motor to obtain a current limit signal voltage thereacross, a rectifier for interconnecting said current limit reference and signal voltages in opposition to produce a second control voltage, said current limit signal voltage being in opposition to said compounding voltage, and means for applying said second control voltage to control said converter to limit the current delivered to said motor.

26. In an electrical system having a power converter for transferring energy from one form into electrical energy, and having a signal impedance effectively connected in series with the energy output of the converter, the provision of a current limit control circuit electrically in circuit with said converter, comprising, a source of reference voltage, a nonlinear impedance for connecting said reference voltage and a signal voltage from said signal impedance effectively in series opposition to obtain a first control voltage to control said converter, and a voltage control circuit having a given impedance value and producing a second control voltage for effecting control of said converter, control means having a continuously variable output operable from said first and second control voltage to control said converter, said signal voltage being variable through a first and a second range, said current limit control circuit having an impedance greater than said given impedance value during said first range to thus permit control of said converter by said voltage control circuit, and said current limit control circuit having an impedance less than said given impedance value during said second range to thus control said converter.

27. A control circuit for a controllable converter supplying variable electrical energy to a load comprising; a current limit control circuit including a current limit reference voltage source for establishing a predetermined value, an impedance effectively connected in series with said load to obtain a current limit signal voltage proportional to current supplied to said load, and rectifier means for effectively connecting said reference and signal voltages in opposition to obtain a differential first control voltage; and a voltage control circuit including a voltage control reference voltage source, an impedance effectively in parallel with said load to obtain a voltage control signal voltage proportional to the converter voltage applied to said load, impedance means for connecting said voltage control reference and signal voltages in opposition to produce a second differential control voltage, said first and second differential control voltages, respectively, effecting control of said controllable converter when said current limit signal voltage is greater than and less than a predetermined value established by said current limit reference voltage.

28. A control circuit for a controllable converter supplying variable electrical energy to a load comprising; a current limit control circuit including a current limit reference voltage source for establishing a predetermined value, an impedance effectively connected in series with said load to obtain a current limit signal voltage proportional to current supplied to said load, and rectifier means for effectively connecting said reference and signal voltages in opposition to obtain a differential first control voltage; and a voltage control circuit including a voltage control reference voltage source, an impedance effectively in parallel with said load to obtain a voltage control signal voltage proportional to the converter voltage applied to said load, impedance means for connecting said voltage control reference and signal voltages in opposition to produce a second differential control voltage, said current limit control circuit having an impedance greater than said impedance means when said current limit signal voltage is less than said predetermined value to establish control of said converter by said voltage control circuit, and said current limit control circuit having an impedance less than said impedance means when said current limit signal voltage is greater than said predetermined value to thus establish control of said converter by said current limit control circuit.

29. A control circuit for a controllable converter supplying variable electrical energy to the armature of a direct current motor, a current limit control circuit including a current limit reference voltage source for establishing a predetermined value, an impedance effectively connected in series with said armature to obtain a current limit signal voltage proportional to current supplied to said armature, and rectifier means for effectively connecting said reference and signal voltages in opposition to obtain a differential first control voltage, and a voltage control circuit including a voltage control reference voltage source, an impedance effectively in parallel with said armature to obtain a voltage control signal voltage proportional to the converter voltage applied to said armature, impedance means for connecting said voltage control reference and signal voltages in opposition to produce a second differential control voltage, said first and second differential control voltages, respectively, effecting control of said controllable converter when said current limit signal voltage is greater than and less than a predetermined value established by said current limit reference voltage, and a filter condenser connected across said impedance means to minimize the fluctuations of voltage between the armature and at least one of the reference voltage sources.

30. In an electrical system having a motor generator set wherein the generator supplies electrical energy to the armature of a second motor, having a controllable converter supplying power to the generator field, and having a resistance effectively connected in series with said second motor to obtain a current limit signal voltage thereacross, the provision of a control system, including, a first and a second current limit controlling circuit, said first current limit controlling circuit including a first current limit reference voltage source, a first rectifier for interconnecting said first current limit reference and signal voltages in opposition to produce a first differential control voltage, means for applying to said converter said first differential control voltage in the correct sense to control said converter when the second motor current reaches a predetermined value and to prevent any further undesirable rise in the second motor current, said second current limit controlling circuit including a second current limit reference voltage source opposing said first current limit reference voltage source, a second rectifier connected in opposition to said first rectifier, means for interconnecting said second current limit reference voltage and said current limit signal voltage in opposition through said second rectifier to produce a second differential control voltage to thus control said converter upon a given value of regenerative second motor armature current.

31. In an electrical system having a motor generator set wherein the generator supplies electrical energy to the armature of a second motor, having a controllable converter supplying power to the generator field, and having a resistance effectively connected in series with said second motor to obtain a current limit signal voltage thereacross, the provision of a control system electrically in circuit with said converter, including a voltage controlling circuit, and a first and a second current limit controlling circuit, said voltage control circuit including a voltage control reference voltage source, means for obtaining a fixed fraction of the second motor voltage as a voltage control signal, and means for balancing said voltage control signal against said voltage control reference voltage to produce a first differential control voltage to control said converter, said first current limit controlling circuit including a first current limit reference voltage source, a first rectifier for interconnecting said first current limit reference and signal voltages in opposition to produce a second differential control voltage, means for applying to said converter said second differential control voltage in the correct sense to dominate the control of said converter established by said voltage control circuit when the second motor current reaches a predetermined value and to prevent any further undesirable rise in the second motor current, said second current limit controlling circuit including a second current limit reference voltage source opposing said first current limit reference voltage source, a second rectifier connected in opposition to said first rectifier, and means for interconnecting said second current limit reference voltage and said current limit signal voltage in opposition through said second rectifier to produce a third differential control voltage to thus control said converter upon a given value of regenerative second motor armature current.

32. A control system for a controllable power converter supplying electric power to a load, said control system comprising a voltage control circuit and a current limit controlling circuit, said voltage control circuit including a voltage control reference voltage source, impedance means connected across said load for obtaining a fraction of the load voltage as a voltage control signal, and means for balancing said voltage control signal against said voltage control reference voltage to produce a first differential control voltage to control said converter, said current limit controlling circuit including a current limit reference voltage source, a resistance effectively connected in series with said load to obtain a current limit signal voltage thereacross, a rectifier for interconnecting said current limit reference and signal voltages in opposition to produce a second differential control voltage, means for applying to said converter said second differential control voltage in the correct sense to dominate the control of said converter established by said voltage control circuit when the load current reaches a predetermined value and to prevent any further undesirable rise in the load current, and a filter condenser connected across at least a part of said impedance means, said filter condenser having a value such that fluctuations of voltage in said impedance means substantially equal and oppose voltage fluctuations in said resistance.

33. In an electrical system having a controllable power converter supplying power to a load, and having an impedance in series with said load, the provision of a first control circuit and a current limit control circuit, said first control circuit including means for obtaining a voltage from the load and from a first reference voltage source to control the converter output when the load current is less than a predetermined value, said current limit control circuit including a second reference voltage source, and a rectifier for interconnecting said impedance and said second reference voltage source in opposition to allow the voltage drop in the series impedance to take control of the converter output after the load current has reached said predetermined value.

34. In an electrical system having a controllable electric power converter supplying power to a load, and having an impedance effectively connected in series with the load to obtain a current limit signal voltage thereacross, the provision of a voltage control circuit and first and second current limit control circuits, said voltage control circuit including a voltage control reference voltage source, means for obtaining a fixed fraction of the load voltage as a voltage control signal, and means for balancing said voltage control signal against said voltage control reference voltage to produce a first differential control voltage to control said converter, said first current limit control circuit comprising a first current limit reference voltage source, a first rectifier for interconnecting said first current limit reference and signal voltages in opposition to produce a second differential control voltage, and means to apply to said converter said second differential control voltage to effect control of said converter when said converter output exceeds a predetermined value, said second current limit control circuit comprising a second current limit reference voltage source opposing said first current limit reference voltage source, a second rectifier connected in opposition to said first rectifier to interconnect said second current limit reference voltage and said current limit signal voltage to produce a third differential control voltage to thus control said converter when the current in said load exceeds a given value in the reverse direction.

35. A control system for a controllable converter supplying power to a motor armature, said control system comprising a voltage controlling circuit and a first and a second current limit controlling circuit, said voltage control circuit including a compounding impedance in series with the armature to obtain a compounding voltage, a voltage control reference voltage source, means for obtaining a fraction of the armature voltage as a voltage control signal, and means for balancing said voltage control signal against the sum of said compounding voltage and said voltage control reference voltage to produce a first differential control voltage to control said converter, said first current limit controlling circuit including a first current limit reference voltage source, a resistance effectively connected in series with said motor armature to obtain a current limit signal voltage thereacross, a first rectifier for interconnecting said first current limit reference and signal voltages in opposition to produce a second differential control voltage, means for applying to said converter said second differential control voltage in the correct sense to dominate the control of said converter established by said voltage control circuit when the armature current reaches a predetermined value and to prevent any further undesirable rise in the armature current, said second current limit controlling circuit including a second current limit reference voltage opposing said first current limit reference voltage, a second rectifier connected in opposition to said first rectifier, means for interconnecting said second current limit reference voltage and said current limit signal voltage in opposition through said second rectifier to produce a third differential control voltage to thus control said converter upon a given value of regenerative motor armature current.

36. A control system for a controllable converter supplying power to a motor armature, said control system comprising a voltage controlling circuit and a current limit controlling circuit, said voltage controlling circuit including a compounding impedance in series with the armature to obtain a compounding voltage, a voltage control reference voltage source, impedance means for obtaining a fraction of the armature voltage as a voltage control signal, and means for balancing said voltage control signal against the sum of said compounding voltage and said voltage control reference voltage to produce a first differential control voltage to control said converter, said current limit controlling circuit including a current limit reference voltage source, an impedance effectively connected in series with said motor armature to obtain a current limit signal voltage thereacross, a rectifier for interconnecting said current limit reference and signal voltages in opposition to produce a second differential control voltage, means for applying to said converter said second differential control voltage in the correct sense to dominate the control of said converter established by said voltage control circuit when the armature current reaches a predetermined value and to prevent any further undesirable rise in the armature current, and a filter condenser connected across at least a part of said impedance means, said filter condenser having a value such that fluctuations of voltage in said impedance means substantially equal and oppose voltage fluctuations in said compounding impedance.

37. In a system having a continuously controllable converter with an electrical output, and having an impedance effectively connected in series with said electrical output, the provision of a control circuit, including a reference voltage source, substantially unidirectional current passing means for connecting said impedance and said reference voltage source to obtain upon passage of current through said unidirectional current passing means a stepless and continuously variable resultant voltage, and means to apply said resultant voltage to control said converter.

38. In an electrical system having a controllable electric power converter supplying power to a direct current motor armature, having a first impedance in series with the armature for obtaining a compounding voltage, and having a second impedance effectively connected in series with the motor armature to obtain a current limit signal voltage thereacross, the provision of a control system electrically in circuit with the converter comprising a speed-controlling circuit and a current limit controlling circuit, said speed-controlling circuit including a speed controlling reference voltage source, means for obtaining a fraction of the converter output voltage as a speed control signal, and means for balancing said speed-controlling signal against the sum of said compounding voltage and said speed-controlling reference voltage to produce a first control voltage to control said converter, said current limit controlling circuit including a current limit reference voltage source, a rectifier for interconnecting said current limit reference and signal voltages in opposition to produce a second control voltage, said current limit signal voltage being in opposition to said compounding voltage, and means for applying said second control voltage to control said converter to limit the current delivered to said motor armature.

WALTER J. BROWN.

REFERENCES CITED

The following references are of record in the file of this patent:

UNITED STATES PATENTS

| Number | Name | Date |
|---|---|---|
| 2,082,496 | Howe | June 1, 1937 |
| 2,238,810 | Crever | Apr. 15, 1941 |